Sept. 7, 1948.  M. ZWILLINGER ET AL  2,448,568
APPARATUS AND METHOD FOR RECTIFYING AND
PROJECTING AERIAL PHOTOGRAPHS
Filed March 7, 1941  4 Sheets-Sheet 1

INVENTOR
Max Zwillinger
BY Samuel G. Hall
ATTORNEY

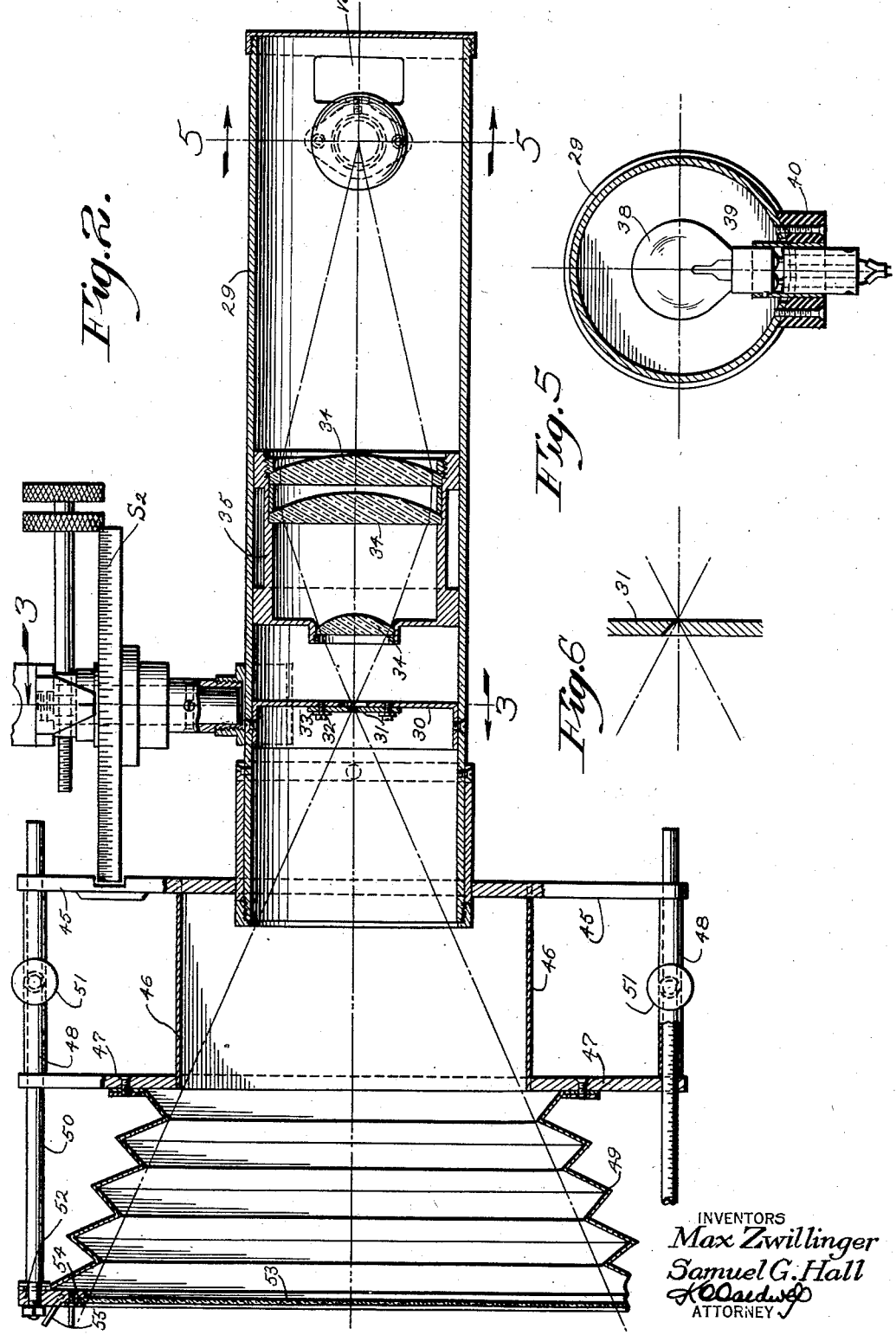

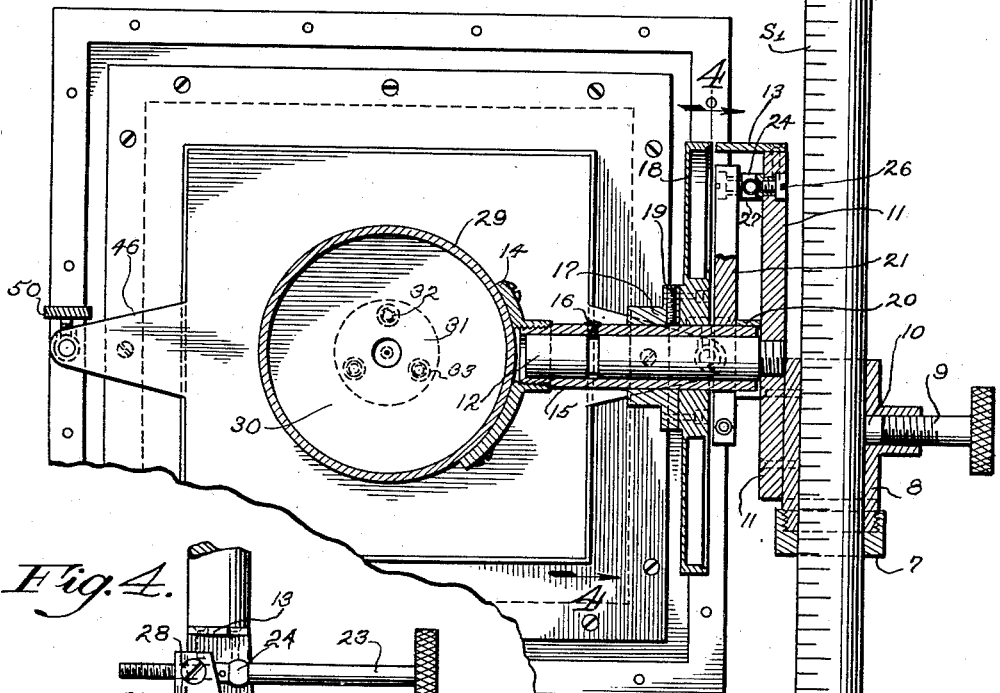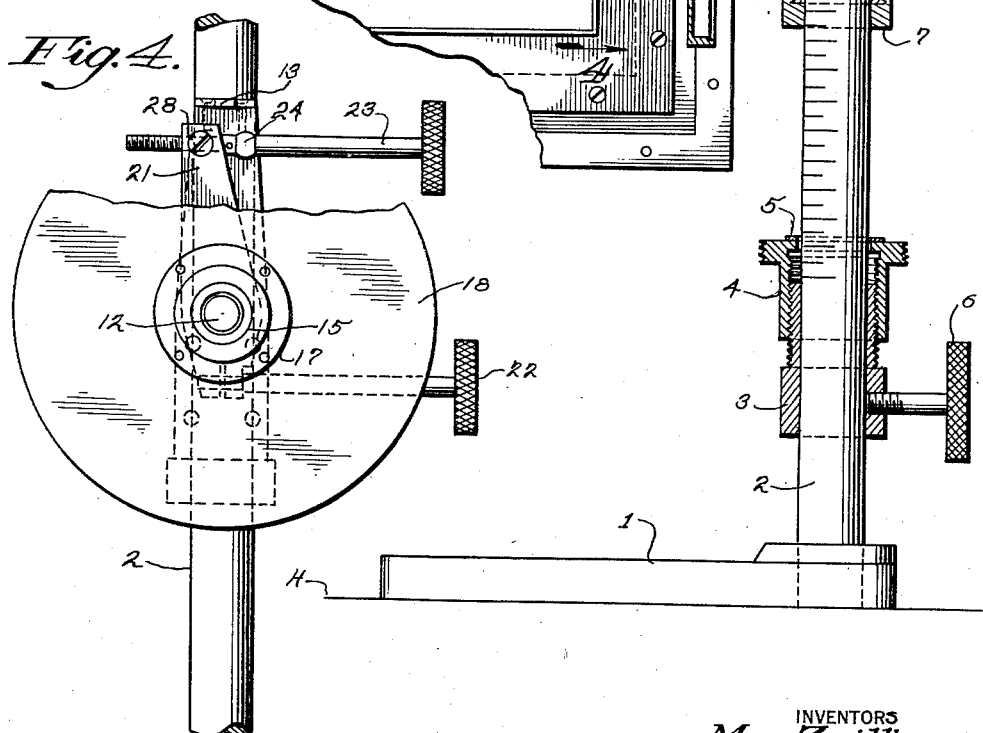

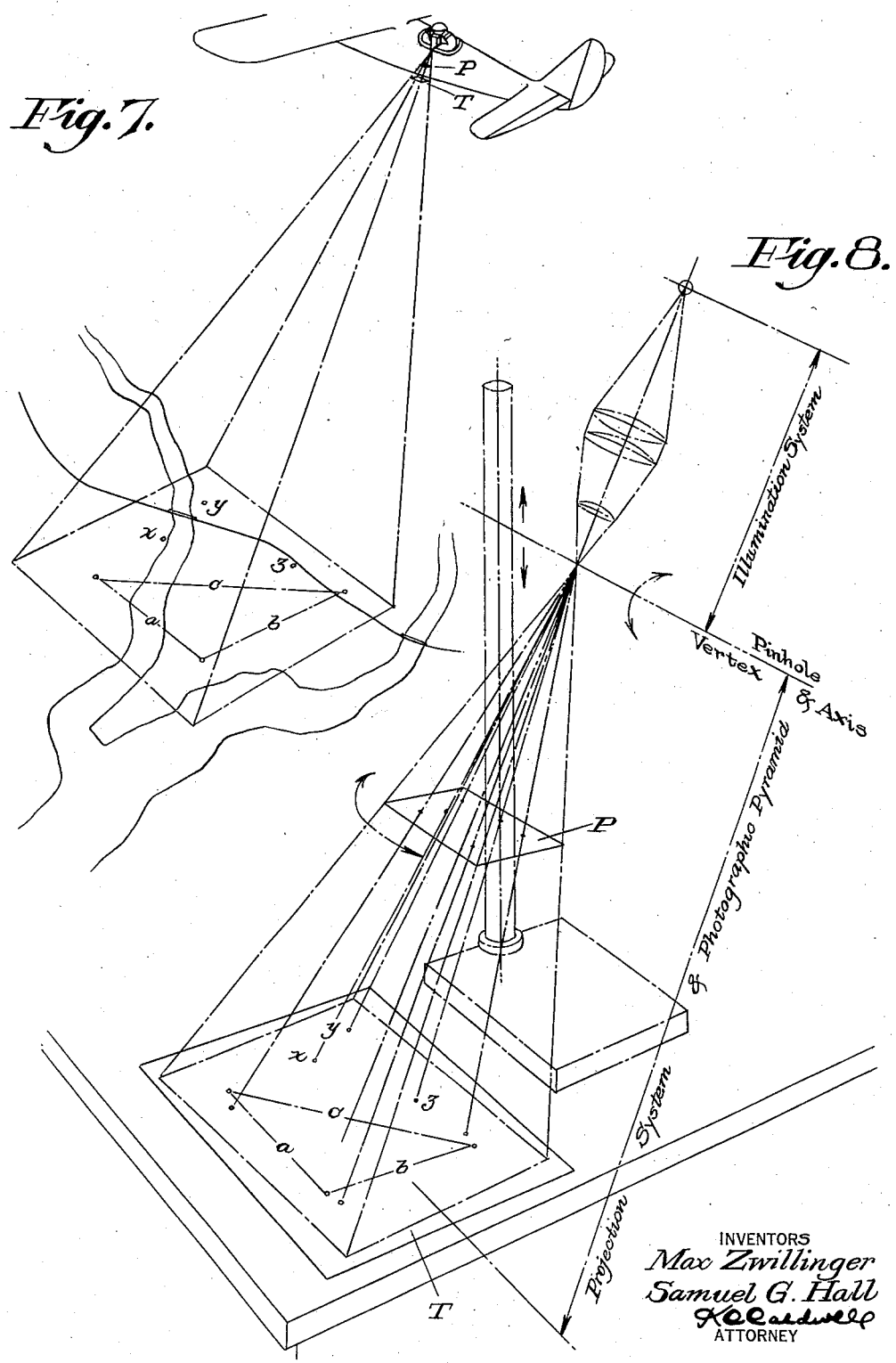

Patented Sept. 7, 1948

2,448,568

UNITED STATES PATENT OFFICE 2,448,568

APPARATUS AND METHOD FOR RECTIFYING AND PROJECTING AERIAL PHOTOGRAPHS

Max Zwillinger and Samuel G. Hall, Washington, D. C.

Application March 7, 1941, Serial No. 382,178

12 Claims. (Cl. 88—24)

(Granted under the act of March 3, 1883, as amended April 30, 1928; 370 O. G. 757)

This invention relates to an improved method and apparatus for rectifying aerial photographs so that the effects of tilt are eliminated, and is particularly useful in the determination of the spacial configuration of any number of substantially co-planar objects which appear in the photographed area so that the location of these objects may be accurately plotted to any desired scale upon a suitable flat surface.

It is a primary object of our invention to provide apparatus which is capable of rectifying aerial photographs taken at any angle of tilt or lean of the camera.

It is a further object of our invention to provide apparatus for rectifying aerial photographs by using a pinhole projector, whereby the defects due to imperfections in the projection lenses are avoided.

It is also an object of our invention to provide an apparatus for reproducing the spacial configuration of any number of co-planar points in an aerial photograph easily and rapidly and at any selected scale of reproduction.

It is another object of our invention to provide a projector for rectifying aerial photographs which can be accurately set at the same angle of tilt and lean the camera had when the picture was taken, whereby only two control points are necessary to accurately establish the position of the projector in reference to the projection surface.

It is also an object of our invention to provide a projector for rectifying aerial photographs which can be properly oriented without any known control points, the orientation being completely determined from the recorded data of the position of the camera.

It is a further general object of this invention to provide apparatus for rectifying aerial photographs rapidly and simply without any auxiliary computation, complicated readjustments, and with freedom from the restrictions upon the selected scale of reproduction which are characteristic of the apparatus which comprise the prior art.

In general, the projectors of the prior art which have been used for rectifying aerial photographs taken at an oblique angle with reference to the vertical, use one or more projection lenses in the optical system of the projector, and therefore require the photograph and the projection surface to be positioned at conjugate focal distances from the lens in accordance with well known optical principles. The scale of reproduction is thus limited by its dependence upon the comparative focal lengths of the projector and camera lenses, and in order to obtain a reproduction at the desired scale, the rectified reproduction must be further enlarged or reduced, as by photographic process, for example. By means of the pinhole projector of this invention the spacial configuration of the principal co-planar points in the aerial photograph can be reproduced at any desired scale by merely adjusting the perpendicular distance between the pinhole and the plane of projection.

In order to rectify photographs taken at large angles of inclination from the vertical, many of the prior art projectors have incorporated therein various means comprising adjustments of certain devices dependent upon auxiliary calculations for overcoming the difficulties of magnifying the image to a desired scale, achieving a geometrically correct rectification and obtaining a reasonably clear focus over an inclined projection surface, with all adjustments being subject to the law of conjugate focal distances referred to above. For example, in using the photographic reconstruction apparatus, as illustrated and described in the U. S. patent to Roussilhe, 1,410,127, issued March 21, 1922, the operator, in order to obtain an accurate rectification, is required to make a number of adjustments which comprise tilting of the photograph, lenses and the projection surface to precalculated angles determined by certain mathematical relationships therein set forth. It naturally requires time to make these calculations and differential adjustments, and furthermore, the range of this projector is considerably limited.

In the projectotr of our invention no precalculations or readjustments are necessary and the projector may be used successfully where the tilt angle of the photograph is extremely large, 75° from the vertical for instance. This is far beyond the range of any prior art rectifying apparatus similar to that of Roussilhe.

The method and apparatus which we have devised for obtaining the spacial configuration of any number of co-planar points in the aerial photograph by using a pinhole in projection has not, to our knowledge, been used in the prior art, although the advantages of a pinhole over the lens for projection purposes have long been known. In fact, it is noted that the U. S. patent to Cooke, No. 1,713,498, of May 14, 1929, considers the projection lenses to be replaced by hypothetical pinhole apertures in order to develop the geometrical relationships therein set forth. in fact, the consideration of a lens as equivalent to a pinhole aperture is implied in all lens equations and calculations involving transverse magnifications of an image. However, no attempt is made by Cooke or any other patentee, to our knowledge, to use a pinhole rather than a lens for projection, since it is obvious that a pinhole could not be used in the apparatus disclosed by Cooke for reproducing the photograph, because the photograph is placed between the light source and the lens, and if a pinhole were to be used it must necessarily be large enough to transmit sufficient light for reproduction, and the image produced would be diffused. In our device we have positioned the pinhole between the light source and the photograph so that the pinhole may be intensely illuminated by means of a system of condenser lenses.

In the projector of our invention the photograph is mounted between the pinhole and the projection surface so that the pinhole may be intensely illuminated by means of a condenser lens assembly, whereby the amount of illumination of the pinhole will be sufficiently intense to reproduce the principal co-planar points in the photograph. It should be understood, therefore, that we consider the development of the method and apparatus hereinafter set forth which permits the use of a pinhole in projection, in rectifying aerial photographs to obtain the special configuration of principal co-planar points, as an important object of our invention. In fact, we consider it our primary contribution to this art, since by means of the pinhole in projection, photographs taken at large angles of lean and tilt of the camera may be rectified and reproduced at any scale without considering any entangling interrelationship between the focal lengths of the camera and projection lenses.

In the Cooke Patent, No. 1,713,498 (page 6, line 31), it is stated that the focal length of the projection lens should preferably be shorter than that of the camera with which the photograph was taken. This naturally limits the utility of this projector and is to provide approximately for the hyperfocal distance within the projector.

$$\left(\text{Hyperfocal distance} = F \times \frac{\text{size of image or photograph}}{\text{size of object or projection image}}\right)$$

When a camera or projector is focused on a near object, the photograph is positioned beyond the principal focal plane of the lens by an amount equal to the effective focal length of the lens multiplied by the magnification or minification. This complicated interrelationship between focal length of camera and projector is avoided in the viewing instrument comprising our invention.

Certain constructional features of my invention, which are designed to produce the results set forth above are novel, and while they do not appear here as specific objects of our invention, they are important, and are made the subject matter of some of the appended claims.

With the foregoing and other objects in view, the invention consists in the construction, combination and arrangement of parts hereinafter described and illlustrated in the drawing, in which:

Fig. 2 is a longitudinal sectional view taken on line 2—2 of Fig. 1.

Fig. 3 is a cross-sectional view taken on line 3—3 of Fig. 2.

Fig. 4 is a cross-sectional view taken through the axis of the projector as on line 4—4 of Fig. 3.

Fig. 5 is a cross-sectional view taken on line 5—5 of Fig. 4, showing the lamp mounting on the end of the projector.

Fig. 6 is an enlarged detail sectional view of the pinhole.

Fig. 7 is a schematic diagram showing an aerial photograph being made over a section of territory showing the relative angles involved; and Fig. 8 is a schematic diagram of the projection outfit set up for operation with the photograph made over.

Figure 1:
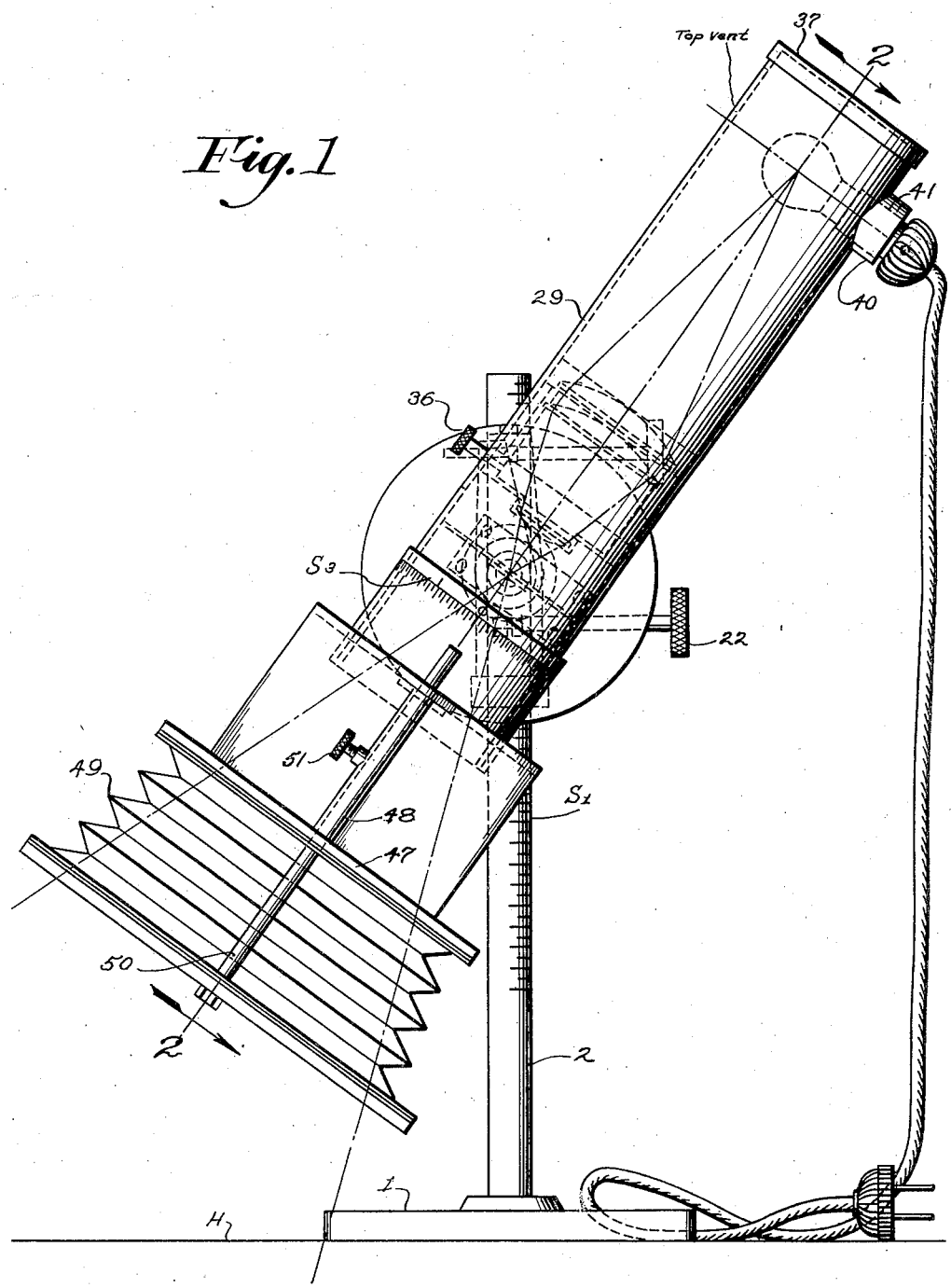
Fig. 1 is a side elevational view of the pinhole projection machine, as set up for operation.

The principle upon which the viewing instrument of our invention operates may be readily understood by considering the schematic diagrams of Figs. 7 and 8. The geometrical configuration existing at the time of taking an aerial photograph is illustrated in Fig. 7. The lines $a$, $b$ and $c$ connect three control points, the location of each of which is known. Points $x$, $y$ and $z$ represent the position of objects, the relative location or exact spacial configuration of which is to be determined by the rectification of a photograph of the area within which these points and the control points are located. For our particular purpose the ground is considered to be substantially flat and level, i. e., the points $a$, $b$, $c$, $x$, $y$ and $z$ are assumed to be co-planar. The position of the planes of the photograph and projection surface are also indicated in this view at P and T, respectively. These planes are shown enlarged in Fig. 8, which represents the geometrical configuration during rectification of the photograph taken, as illustrated in Fig. 7.

It is noted that the plane of the projection surface, or the plane of rectification coincides with the plane of the base of the projector or viewing instrument.

Referring now to Fig. 7, it will be seen that the rays joining the ground figure with the front principal point A of the camera lens form a photographic pyramid. If these rays were intersected by a plane T parallel to the ground or the plane of the points $a$, $b$, and $c$, it is apparent that a figure would be formed on T which would be geometrically similar to the ground figure. Furthermore, the size of this figure would be in the same ratio to the sizes of the ground figure as the perpendicular distance of the plane T from the principal points bears to the altitude of the said principal point above the ground. If, however, the plane T were not parallel to the ground, then the figure formed on it would not be geometrically similar to the ground figure but would be distorted, and the above ratio of distances would no longer apply.

If the photographic pyramid were reconstructed from the photograph, and were also intersected with a plane whose angular position with respect to the pyramid is the same as that of the ground with respect to the photographic pyramid, a true rectification on the intersecting plane would result. Furthermore, by adjusting the perpendicular distance between the vertex of the pyramid and the intersecting plane, this rectified figure could be brought to a prescribed scale.

In Fig. 8 the photograph P is shown in its position in space when mounted in the projector. The photograph is perpendicular to the longitudinal axis of the projector at the optical center of the photograph, and the distance from the illuminated pinhole to the center of the photograph is adjusted to equal the effective focal length of the camera lens. In other words, the photograph occupies a position relative to the illuminated pinhole that is geometrically similar to the position occupied by the negative in reference to the rear principal point of the camera lens when the exposure was made. Now, if the photograph while remaining in this position, is pierced with a pin or otherwise perforated at the images of the various ground points, pencils of light emanating from the illuminated pinhole will pass through these perforations and form a photographic pyramid. These rays or pencils of light impinge upon the projection surface T, producing small dots of light thereon which form a projected figure of the perforated points.

In order to secure a true rectification it is necessary to bring the plane of projection into a correct angular position relative to the photographic pyramid formed by these rays of light. This may be accomplished by laying off on the projection surface three control points indicated in Figs. 7 and 8 at the intersection of lines $a$, $b$, and $c$. The position of these points in space is known and is laid off to any desired scale.

The images of the control points in the photograph are also perforated so that the pencils of light through these perforations may be brought into coincidence with the plot of the control points. This is accomplished by tilting the axis of the pyramid about a horizontal axis through the vertex and by rotating the pyramid about its own axis. These motions of the reproduced pyramid are attained by means of a tilt and lean adjustment of the projector mounting to be described later in this specification. If the angles of tilt and lean of the camera are known, the projector may be adjusted to these values by appropriate scale and adjusting means formed thereon. The only remaining adjustment for correct positioning of the projector at the desired scale is the altitude adjustment. After proper adjustment between the projector and projection surface other points which have been perforated in the photograph may be traced or marked on the projection surface, after which they may be ready for scaling-off to the same scale by which the control points were laid off.

Without particularly limiting ourselves to any special use for the apparatus and method of reproducing aerial photographs or plotting to any scale the particular configuration of the principal objects in the photograph, as outlined above, its military application should at once be apparent, since it presents a considerable advance in this art for the particular purpose for which it is primarily designed.

The structural details of a viewing instrument comprising the principal features of our invention, as illustrated in Figs. 1 to 6, inclusive, will now be described. The projector assembly is adjustably supported on the vertical column 2 by means of a collar 8 and set screw 9. This vertical column 2 has an altitude scale S1 engraved thereon and is rigidly secured to a heavy base member 1 so as to be movable along a horizontal surface H. The lower portion of the collar 8 is provided with a bearing cap 7 which is threaded into the collar 8 and has a bearing surface on its under side. The altitude adjustment comprises two separate assemblies, as illustrated in Fig. 3. By means of the collar 8, set screw 9 and contact pin 10, which distributes the pressure of screw 9 to the vertical column 2, the projector assembly may be moved by hand vertically along the column 2 to provide a rough approximation of the altitude setting of the projector. The delicate precise altitude adjustment is made by means of the sleeve 3 and adjusting nut 4. In order to provide for this adjustment the set screw 6 is loosened and the adjustment assembly is raised by hand along the column 2 until the thrust washer 5 comes into intimate contact with the under side of the bearing cap 7 of the projector support collar 8. The set screw 6 is then tightened and the set screw 9 is loosened so that the projector assembly is supported by the sleeve 3 alone. The knurled flanged adjusting nut 4 is threaded onto the sleeve 3 and as this nut is turned by hand, minute adjustments of the projector's vertical position relative to the projection surface, may be made.

The altitude setting of the projector is read on scale S1 at the top of the collar 8. In the specific illustrated embodiment this scale is divided in intervals of $\frac{1}{3}$ inch, so as to read the height of the pinhole from the bottom of the base in thirds of an inch. If a scale of reproduction of 1 inch equals 100 yards (300 feet) is selected, scale S1 will then read the corresponding altitude directly in hundreds of feet.

The projector is also supported on the stand comprising the base 1 and column 2 so that it may be tilted about a horizontal axis through an angle of approximately 180° to correspond to the angle of tilt of the camera when the photograph was taken. The angle of tilt is indicated on the scale S2 engraved on the drum 18 which, in this specific embodiment, is divided into degrees and half degrees from 0° to 90° in both directions from the zero position. The scale reads zero when the projector is pointing vertically downward. A supporting bracket 14 is secured to the body 29 of the projector. A bearing sleeve 15 is threadably secured to this bracket so as to be rotatable about a spindle 12 which is secured to the supporting plate 11 of the adjustable collar 8. A suitable index 13 extends from the supporting plate 11 to a point adjacent the scale S2. The horizontal spindle 12 is grooved for a set screw 16 so as to prevent any lateral movement of the projector assembly relative to the column 2. The scale drum 18 has a flanged collar 17 into which the set screw 19 is threaded so as to engage the sleeve 15 to prevent any relative movement between the scale drum and the bearing sleeve 15. A clamp 21 surrounds the bearing sleeve with an arm extending radially therefrom. The clamp is retained in a position axially spaced from the supporting plate 11 by means of the spacing collar 20. One end of the clamp is bifurcated and may be drawn together by means of the clamping screw 22 so as to bind said clamp and arm to the sleeve 15. To provide for angular adjustment of the clamp 21 and sleeve 15 relative to the supporting plate 11 and column 2 a threaded swivel socket 27 is secured to the clamp arm opposite its yoked end by means of the screw 28. The socket 27 is free to rotate within the arm of the clamp 21 and is fitted loosely therein so as to have a slight movement radially along the arm of the clamp.

A swivel socket 24 is also secured to the supporting plate 11 by means of the screw 26, so as to be rotatable therein and is also loosely fitted so as to have a slight movement vertically along the plate. The tangent screw 23 is rotatable within the swivel socket 24, and is provided with a shoulder which is held against the socket 24 by means of a securing sleeve 25 pinned to the shaft 23, thereby preventing any axial movement of the shaft relative to the swivel socket. The tangent screw 23 is threaded into the swiveled socket 27. Now, when the clamp screw 22 is loosened the projector may be tilted about the horizontal axis by hand to provide a rough approximation of the proper angle of tilt of the projector which should be equivalent to the angle of tilt of the camera when the photograph was taken. To provide for accurate adjustment of the angle of tilt, the clamping screw 22 is tightened, securing the clamp to the sleeve 15, and as tangent screw 23 is rotated the angular position of the clamp relative to the plate is changed to provide a precise adjustment of the angular position of the projector.

The projector assembly is also provided with a means whereby the photograph and holder assembly may be rotated around its optical center through an angle of approximately 45° in either direction from its middle or zero position, to position the projector upon the stand with the same angle of lean the camera had when the photograph was taken. The angle of lean is indicated by the scale S3 engraved on the rotatable sleeve 44.

In the specific illustrated embodiment this scale is calibrated in degrees and half degrees from 0 to 45 in both directions. The rotatable sleeve 44 is held in place by means of an end guide 42 which is threaded on to the base of the projector assembly to provide a retaining shoulder therefor. The spider 45 is rigidly secured to the rotatable sleeve 44 so as to be rotatable therewith and carries a cylindrical spacing member 46 which holds the lower spider member 47 in its position spaced along the optical axis of the projector, as illustrated in Fig. 4. Two hollow cylindrical pillars 48 are spaced between the spiders 45 and 47 to provide a bearing surface for the slidable rods 50 and 50a positioned therein. One end of each of these rods is suitably secured to the frame 52 of the photograph mount body plate 53. A plurality of inclined pins 55 are secured in a row along each side of the frame 52. The plane of the body plate 53, which is made of a clear glass of good optical quality, is mounted in the frame 52 so as to be perpendicular to the axis of the projector and is held in place by means of a retaining strip 54.

The bellows 29 is attached to the inner side of the spider as at 56 and to the inner surface of the frame 52 by means of another retaining strip 57. The glass plate 53 is engraved on its outer face with four indices located at the midpoints of each side, so that the lines connecting opposite indices intersect at right angles at the optical center of the photographic mount. The adjustable set screws 51 are threaded in each of the pillars 48 and engage the rods 50, holding the photographic plate and rods in their adjusted position, so that te distance between the plate and the pinhole diaphragm 31 may be adjusted and still retain the plate perpendicular to the axis of the projector. The optical distance between the outer surface of the plate 53 and the pinhole diaphragm 31 is indicated by means of the focal length scale S4 engraved on the rod 50a and calibrated in millimeters. (The optical distance is the actual mechanical distance corrected for the refraction of light passing through the glass plate.)

The particular photographic prints for whose rectification this viewing instrument was developed have no margin outside the photographic image, hence the means shown for holding the photograph in place consists of a number of inclined pins 55, which are secured to the holder frame, as described above, and between which a soft rubber band is stretched across the back of the photograph. Some standard means, well known to the art, would be more suitable for prints having a margin and could, of course, be substituted for the holding means herein disclosed.

The optical system of the projector consists essentially of an illuminated pinhole aperture formed in the diaphragm 31, which is secured to the mounting plate 30 by a plurality of screws 32. The diaphragm is provided with an enlarged hole formed about each of the screws so that its position may be adjusted laterally relative to the optical axis of the projector to properly position the pinhole formed in the center thereof. The washers 33 are provided to eliminate shifting of the diaphragm 31 while the screws are being tightened. The projection lamp 38 comprises the source of illumination for the pinhole. This lamp is connected to suitable electrical conductors which, in turn, are adapted to be connected to an electrical power supply source by being inserted into the bayonet socket 39. An insulated lamp socket support 39 is secured to the body member and has an opening formed therein within which the bayonet socket is rotatably and slidably supported. A set screw 41 is provided to hold the socket in its adjusted position.

A condenser lens assembly, comprising the condenser lenses 34 and the retaining cell 35 are provided for the purpose of converging the rays of light emanating from the projector lamp filaments so that a very intense image of the lamp filament will be formed directly at the pinhole. The body 29 of the projector has a longitudinal slot formed therein to permit longitudinal movement of the set screw 36, which set screw is threadably secured to the retaining cell 35 and may be tightened to lock the condenser lens assembly in its adjusted position. It is thus apparent that means are provided for rotating the lamp and adjusting its lateral position in the insulated support, for adjusting the pinhole aperture a small amount transversely to the axis, and for sliding the condenser lens assembly longitudinally with the axis in order to secure the best illumination of the pinhole aperture. The condenser lenses are so spaced and proportioned that light emanating from the lamp and passing the pinhole aperture is in the form of a cone of sufficient angularity to completely fill out the photograph which is mounted in front of the pinhole. An end cover 37 is removably secured to the projector body so that the lamp may be renewed and suitable vents may be provided in the body to permit the circulation of air therethrough to cool the lamp.

The operation of the viewing instrument is as follows: Two orthogonal center lines are drawn on the back of the photograph to be rectified, intersecting at its optical center. The photograph is then perforated with a prick punch at all control points, and also at all points whose positions in space are to be determined. The photograph is then mounted with its face against the outer surface of the holder, with its horizon side uppermost, and with its center lines in register with the engraved indices on the holder. The focal length adjustment is then set to equal the effective focal length of the camera lens by means of scale S4. This adjustment is not varied during the process of rectification. The projector is now ready for orientation by any of several methods, depending upon the available data relating to the position of the camera when the photograph was taken.

This invention was designed particularly for use where the essential given data comprises the positions of three co-planar control points not in a straight line, and the effective focal length of the camera. This data is usually supplemented by the approximate altitude of the photographing aircraft, as recorded by an altimeter. While not essential, this information assists the operator in making the first rough adjustment of the proper position of the projector. Frequently the position of more than three control points are known and, of course, increase the accuracy of the rectification.

The orientation of the projector is secured by trial and error methods. A pot of the control points to the desired scale (usually 1"=100 yds.) is laid down on white paper. If the approximate altitude of the photographing airplane above the ground is known, the altitude setting of the instrument is brought to this value, to the same scale as the ground plot. (For a scale of rectification of 1"=100 yds., the altitude scale S1 reads the altitude directly in hundreds of feet, for any other scale, the altitude scale is altered in direct proportion.) The angle of tilt (from the vertical) is now estimated very roughly from the perspective of the photograph, and the tilt motion is adjusted to the value on the tilt scale S2.

A pencil of light emanating from the illuminated pinhole passes through each of the perforations in the photograph, and since the photograph has been positioned at an optical distance from the pinhole equal to the focal length of the camera lens and with its optical center in the axis of the projector, these pencils of light reproduce the photographic pyramid, Figs. 7 and 8.

The plot of the control points is now placed on the flat horizontal surface H upon which the base of the instrument is resting, so as to intercept the pencils of light emanating from the projector to produce thereon a number of small spots of light. The tilt and lean position of the projector is now varied by trial and error, the plot being shifted about also so as to keep one control point in coincidence with the corresponding projected spot until the figure enclosed by the projection of the control points is similar to the plotted control figure. The altitude adjustment is now varied until the two figures are the same size and can be made to coincide. Minor readjustments of the tilt, lean and altitude movements may have to be made to bring the two figures into exact coincidence. After proper orientation by this trial and error process, the projected positions of the other control points are marked on the plot and may be scaled off.

This viewing instrument may also be used under a set of conditions wherein the three known control points lie nearly in a straight line, provided the altitude is accurately known. The process of orienting the projector is the same as that outlined above, except that the altitude setting is left fixed during the process of rectification.

In either of the above cases there are two possible orientations which will bring the control point projections into coincidence with the plot, one of them, of course, being false. However, the false orientation is easily detected, since it almost always results in a very obviously distorted perspective, and in obviously incorrect values of the angles of tilt and lean. In general, when four or more control points are available, only one correct orientation is possible.

If the exposure is made with a stabilized camera having indicators for the angle of tilt and lean, this data may be recorded and set off on their respective scales on the viewing instrument. With the position of the viewing instrument set to the recorded data, it is only necessary to vary the altitude adjustment to bring the projected points into coincidence with their plotted positions. Where a stabilized camera is used, or a camera having stabilized means for indicating the angle of tilt or lean, and an accurate measure of the altitude is available, all three values may be set off on the corresponding scales indicating the position of the projector. In this case, no control points are necessary and the orientation of the projector is completely determined by recorded data.

Other modifications and changes in the number and arrangement of the parts may be made by those skilled in the art without departing from the nature of the invention, within the scope of what is hereinafter claimed.

The invention described herein may be manufactured and/or used by or for the Government of the United States of America for governmental purposes without the payment of any royalties thereon or therefor.

We claim:

1. An apparatus for projecting a tilted aerial photograph, comprising a cylindrical body member, a diaphragm containing a pinhole aperture mounted transversely thereof, a source of illumination, means for mounting said source on one side of said diaphragm, means for converging the rays of light emanating from the said source to obtain an intense illumination at the pinhole aperture for projection therethrough, and means for mounting said photograph on the opposite side of said diaphragm and at an adjustable distance from the pinhole aperture therein, the plane of the photograph being perpendicular to the optical axis of said projector.

2. The invention as defined by claim 1, wherein the position of said pinhole aperture, illumination source and said ray converging means may be adjusted to secure maximum intense illumination of said pinhole, whereby the cone of light emanating from its point source will be sufficiently intense and of sufficient angular width to fill out the photograph which the mounting means is adapted to support.

3. An apparatus for projecting a tilted aerial photograph, comprising a source of light, a photographic supporting plate, a diaphragm containing a pinhole aperture mounted intermediate said light source and supporting plate, calibrated means for adjusting the position of the photographic supporting plate along a longitudinal axis so that its distance from the pinhole may be equivalent to the focal length of the camera lens with which the photograph that the supporting plate is adapted to hold was taken, and calibrated means for angularly adjusting the position of the photographic supporting plate about said longitudinal axis so that a photograph supported therein would be rotated about its optical center at an angle equivalent to the angle of lean of the camera with which the said photograph was taken.

4. An apparatus for projecting a tilted aerial photograph to obtain a rectified reproduction on a projection surface of the location of a number of co-planar objects whose images appear therein, comprising a pinhole projector and a support therefor, said projector comprising a casing, a light source, a photographic supporting plate and a diaphragm containing a pinhole aperture mounted intermediate said light source and supporting plate, means for adjusting the vertical position of the pinhole from the projection surface, said means being calibrated to indicate the altitude at which said photograph was taken, and means for adjusting the angular position of said projector relative to said vertical, said means being calibrated so that the angle of tilt of the projector may be accurately set to equal the angle of tilt of the camera when the photograph was taken.

5. The method of rectifying an aerial photograph taken with a camera having means for indicating the true angle of tilt and lean of an area containing no more than two control points whose relative positions are known, which method includes the steps of perforating the photograph at the image of the control points, positioning the photograph in the projector at a distance from the pinhole equivalent to the focal length of the lens of the camera with which the photograph was taken, adjusting the position of the projector so that its angle of tilt and lean is equivalent to that of the camera, and adjusting the vertical distance from the pinhole to the plane of projection surface containing a plot of the control points to the desired scale of reproduction so that the image formed by the pencils of light passing through the perforations impinging upon the projection surface will coincide with the plotted points.

6. The method of rectifying an aerial photograph taken with a camera having means for indicating its true angle of tilt and lean and with means for accurately indicating the altitude at which the photograph was taken, which method includes the steps of positioning the negative of the photograph within an illuminated pinhole projector at a distance from the pinhole equivalent to the focal length of the camera lens, adjusting the position of the projector so that its angle of tilt and lean is equivalent to the recorded angle of tilt and lean of the camera, and adjusting the vertical position of the projector so that the perpendicular distance from the projection surface to the pinhole is equivalent to the altitude at which the photograph was taken, as measured by a scale equivalent to the scale of the reproduction.

7. The method of determining the true special configuration of the images of any number of substantially coplanar objects in an aerial photograph by means of an illuminated pinhole projector, which method includes the steps of positioning the photograph in the projector at a distance from the pinhole equivalent to the focal length of the camera lens with which the photograph was taken, orienting the photograph to obtain a reconstruction of the photographic pyramid from the projection of the points indicating the location of objects in the photograph, intersecting the pyramid with a plane surface whose angular aspect with respect to the pyramid is the same as that of the ground with respect to the pyramid and adjusting the distance between photograph and plane to bring the rectified figure to a prescribed scale.

8. The method of rectifying aerial photographs of areas each containing at least three substantially co-planar control points whose relative positions in space are known, by means of an illuminated pinhole projector, which method includes the steps of perforating said photograph at the said control points, positioning said photograph in said projector at a distance from the pinhole equivalent to the focal length of the camera lens with which the photograph was made, plotting the control points on a plane surface to a desired scale, and orienting said projector until the projected images formed by the pencils of light passing through the perforations coincide with the plotted control points, whereby the photographic pyramid will be reproduced and the projected image will be geometrically similar to the photographed area in a proportion equivalent to the ratio of their respective vertical distances from the vertex of said photographic pyramid.

9. The method of obtaining a rectified plot of the relative location of any number of substantially co-planar objects of a photographed area to any desired scale, said photographed area containing at least three substantially co-planar control points whose relative positions in space are known, which method consists of the steps of perforating the photograph at the image of the said objects and control points, positioning the photograph in an illuminated pinhole projector so that pencils of light passing through the perforations will impinge upon a projection surface containing a plot of said control points producing small dots of light to form a projected geometrical configuration indicating the position of the control points and objects, orienting said projector until coincidence is obtained between the projected and plotted control points, adjusting the perpendicular distance between the pinhole and projection surface to obtain a projection of the objects in the photograph whose relative locations are to be plotted at the desired predetermined scale, and plotting the position of said objects, as indicated by said projection, so that their positions may be scaled off.

10. The method of determining the relative position of a number of substantially co-planar objects in an aerial photograph taken at any oblique angle of tilt of an area containing at least three substantially co-planar control points whose relative positions in space are known, by means of a pinhole projector, which method includes the steps of perforating said photograph at the reproduced images of said objects and control points, positioning said photograph in said projector at a distance from the pinhole equivalent to the focal length of the camera lens with which the photograph was taken, plotting the known control points on a plane surface to any desired scale, orienting said projector until the projected images formed by the pencils of light passing through the perforations coincide with the plotted control points and plotting on the plane surface the projected figure formed by the pencils of light passing through the perforations made on the photograph at the images of the said objects whose positions in space are to be determined, whereby the plot of said objects may be scaled off to the same scale to which the control points were plotted.

11. An apparatus for projecting a tilted aerial photograph to obtain a rectified reproduction on a projection surface of the location of a number of co-planar objects through images appearing therein comprising, a pinhole projector and a support therefor, said projector comprising a casing, a light source, a photographic supporting plate, and a diaphragm containing a pinhole aperture therein mounted intermediate said light source and supporting plate, means for adjusting the vertical position of the pinhole from the projection surface, said means being calibrated to indicate the altitude at which said photograph was taken, means for adjusting the angular position of said projector relative to said vertical position, said means being calibrated so that the angle of tilt of the projector may be accurately set to equal the angle of tilt of the camera when the photograph was taken, and means for angularly adjusting the position of the photographic supporting plate about the longitudinal axis of the projector whereby the photograph supported therein may be rotated about the optical axis of the projector at an angle equal to the angle of lean of the camera.

12. The method of rectifying an aerial photograph taken with a camera having means for indicating its true angle of tilt and lean and with means for accurately indicating the altitude at which the photograph was taken, which method includes the steps of positioning the negative of the photograph within an illuminated pinhole projector at a distance from the pinhole equivalent to the focal length of the camera lens, adjusting the position of the projector so that its angle of tilt and lean is equivalent to the recorded angle of tilt and lean of the camera, and adjusting the vertical position of the projector so that the perpendicular distance from the projection surface to the pinhole is equivalent to the altitude at which the photograph was taken, as measured by a scale equivalent to the scale of the reproduction.

M. ZWILLINGER.
SAMUEL G. HALL.

REFERENCES CITED

The following references are of record in the file of this patent:

UNITED STATES PATENTS

| Number | Name | Date |
|---|---|---|
| 1,228,685 | Magowan | June 5, 1917 |
| 1,528,506 | Opacki | Mar. 3, 1925 |
| 1,692,241 | Armbruster | Nov. 20, 1928 |
| 1,713,498 | Cooke | May 14, 1929 |
| 1,791,604 | Reardon | Feb. 10, 1931 |
| 1,980,981 | Cooke | Nov. 20, 1934 |
| 2,072,286 | Wellington | Mar. 2, 1937 |
| 2,200,594 | Diggins et al. | May 14, 1940 |